United States Patent [19]
Mangir et al.

[11] Patent Number: 5,353,150
[45] Date of Patent: Oct. 4, 1994

[54] GAIN HOMOGENIZATION APPARATUS AND METHOD FOR USE IN STIMULATED SCATTERING OF BEAMS WITH NON-UNIFORM SPATIAL INTENSITY DISTRIBUTION

[75] Inventors: Metin S. Mangir; David A. Rockwell, both of Santa Monica, Calif.

[73] Assignee: Hughes Aircraft Company, Los Angeles, Calif.

[21] Appl. No.: 996,481

[22] Filed: Dec. 23, 1992

Related U.S. Application Data

[63] Continuation of Ser. No. 750,665, Aug. 27, 1991, abandoned.

[51] Int. Cl.[5] .................. G02B 27/00; H01S 3/098
[52] U.S. Cl. .................. 359/338; 359/173; 359/334; 385/5

[56] References Cited

U.S. PATENT DOCUMENTS

| | | | |
|---|---|---|---|
| 4,627,068 | 12/1986 | Johnson et al. | 372/101 |
| 4,733,944 | 3/1988 | Fahlen et al. | 359/133 |
| 4,902,980 | 2/1990 | O'Meara | 372/21 |
| 4,922,495 | 5/1990 | Bobbs et al. | 372/3 |
| 4,958,908 | 9/1990 | Rockwell et al. | 359/338 |
| 4,989,216 | 1/1991 | Chandra et al. | 372/97 |
| 5,059,917 | 10/1991 | Stephens | 359/338 |

FOREIGN PATENT DOCUMENTS

3829728 2/1989 Fed. Rep. of Germany .

OTHER PUBLICATIONS

"A review of phase–conjugate solid–state lasers", D. A. Rockwell, 1988 IEEE, Journal of Quantum Electronics, Jun., No. 6, New York (USA) pp. 1124–1140.

"Experimental investigation of phase conjuagation in stimulated Brillouin scattering of beams with mild cylindrical aberration", Bellum et al., 1988, Optics Letters, 13 (1988) Jan., No. 1, New York (USA) pp. 36–38.

"Improving the quality of phase cojugation of SBS mirrors with smooth aberrations", Bobrov et al., Optics & Spectroscopy 62 (1987) Feb., No. 2, Washington, D.C. (USA), pp. 241–243.

Ridley et al; Opt. Lett., vol. 15, #14, pp. 777–779, Jul. 15, 1990.

Osborne, F. Opt. Soc. Amer. B., Opt. Phys., vol. 7, #10, pp. 2106–2112, Oct. 1990.

Bellum et al., Opt. Lett., vol. 13, #1, pp. 36–38, Jan. 1978.

Summary and Abstract entitled, "Phase Conjugate Fidelity of an SBS Oscillator/Amplifier at the 1–J/Pulse Level", published in the CLEO Proceeding, Apr. 4, 1989.

*Primary Examiner*—Nelson Moskowitz
*Attorney, Agent, or Firm*—V. D. Duraiswamy; W. K. Denson-Low

[57] ABSTRACT

Optical energy transfers, via stimulated scattering, to a seed beam from a pump beam that has a non-uniform optical intensity distribution are made with an enhanced spatial uniformity of amplification by spatial mixing of the pump beam within the medium where amplification takes place. In a stimulated Brillouin scattering (SBS) phase conjugate mirror (PCM) having an amplifier and a phase conjugating oscillator, beam mixing elements are provided on opposite sides of the amplifier to mix both the input and return phase conjugated beams within the amplifier, and to restore the beams after they have exited. The preferred mixing mechanism is a plurality of cylindrical lenses that are spaced along the beam path, and/or have unequal focal lengths to produce a series of foci within the amplification medium that are rotated with respect to each other. Amplitude replication as well as high fidelity phase conjugation are enhanced using SBS.

25 Claims, 3 Drawing Sheets

GAIN HOMOGENIZATION APPARATUS AND METHOD FOR USE IN STIMULATED SCATTERING OF BEAMS WITH NON-UNIFORM SPATIAL INTENSITY DISTRIBUTION

GOVERNMENT RIGHTS

This invention was made with Government support under Contract No. N00014-87-C-0090 awarded by the Department of the Navy. The government has certain rights in the invention.

This is a continuation of application Ser. No. 07/750,665, filed Aug. 27, 1991, now abandoned.

BACKGROUND OF THE INVENTION

1. Field of the Invention

This invention relates to optical beam mixing methods and apparatus, and more particularly to spatial beam mixing such as might be required in stimulated Brillouin scattering (SBS) phase conjugation with an amplifier-oscillator configuration, in which a seed beam is amplified by a pump beam having a non-uniform spatial intensity distribution.

2. Description of the Related Art

Phase conjugation is an optical phenomenon that has attracted considerable attention in recent years. Several different ways of producing phase conjugated beams have been discussed in the literature, including four-wave mixing, stimulated Brillouin scattering (SBS), stimulated Raman scattering (SRS), three-wave mixing and photon echo devices. A review of various applications for optical phase conjugation is presented by Giuliano in *Physics Today*, "Applications of Optical Phase Conjugation", April 1981, pages 27–35. A general review of the field is given in A. Yariv, "Phase Conjugate Optics and Real-Time Holography", *IEEE J. Quantum Electronics*, Vol. QE14, No. 9, pages 650–660 (1978), and in *The Laser Handbook* Vol. 4, edited by M. L. Stitch and M. Boss, chapter 4, by D. Pepper "Non-Linear Optical Phase Conjugation", pages 333–485, North Holland Publishing Co. 1985.

A phase conjugate mirror (PCM) produces a retro-reflection of an incident beam, with the phase of the reflected beam reversed from that of the incident beam at the point of reflection. PCMs can be provided either with external pump beams, as in the four-wave mixer, or as a "self-pumped" device which eliminates the requirement for external pump beams. Of the self-pumped PCMs, those employing SBS or Raman scattering are generally used in connection with high power pulsed laser beams, such as from a Nd:YAG laser.

When any material is penetrated by light of an intensity great enough the material is modified, as is also the light which penetrates it. In SBS, the modified material generates sound waves that reflect phase conjugated light waves. An introduction to practical applications of optical phase conjugation, including detailed presentations of SBS and four-wave mixing, is presented in D. Pepper, "Applications of Optical Phase Conjugation", *Scientific American*, January 1986, pages 74–83.

SRS is described in, among other places, N. Bloembergen, "The Stimulated Raman Effect", *American Journal of Physics*, Vol. 35, November 1967, pages 989–1023. The Raman effect may be described as the scattering of light from matter, such as a gas, liquid or solid, with a shift in wavelength from that of the usually monochromatic incident radiation. The internal degrees of freedom (for example, electronic, vibrational or rotational) of atoms or molecules of the medium couple the incident radiation such that spatial variations within the medium result in a scattering of the incident radiation. This follows from the fact that the optical properties of the molecules vary with the excitation of their internal degrees of freedom.

One type of PCM that is beneficial for lasers in the medium and high energy range (more than five joules/pulse) employs amplifier and oscillator sections that exhibit SBS. Such a system is illustrated in FIG. 1. The overall PCM 2 is shown enclosed within a dashed line. It includes an amplifier section 4 and an oscillator section 6 that are formed from the same SBS medium, or at least from SBS media that have equal sound velocities. This is necessary to tune the amplifier to the same frequency as the oscillator and thereby avoid degradation of the amplification. Many different SBS media are available, such as $N_2$, $CH_4$ and $SF_6$ gases, $CCl_4$, $TiCl_4$ and $CS_2$ liquids, and solid glasses or crystals.

An input beam 8 is processed through a polarizer 10, beamsplitter 12 and quarter-wave plate 14 into the amplifier 4. After exiting the amplifier, the beam proceeds through an attenuating filter (or partially reflecting tilted mirror) 16 and is focused by a spherical lens 18 into the oscillator or seed generator 6, which functions as a self-pumped PCM. A weak phase conjugated seed is returned from the oscillator or generator 6 back to the amplifier 4, where it interacts with the relatively stronger input beam. Energy is transferred from the input to the phase conjugated return beam within the amplifier 4, and the amplified return beam is directed back through the quarter-wave plate 14. For monitoring purposes, the beamsplitter 12 together with mirrors 20, 22 and 24 are shown diverting a portion of the returned beam to a far-field camera 26, while the remainder of the return beam is directed by polarizer 10 onto a screen 28, upon which its near-field characteristics can be observed.

Systems of the type illustrated in FIG. 1 have been discussed in N. F. Andreev et al., "Nonstationary stimulated Mandel'shtam-Brillouin scattering of focused light beams under saturation conditions", *Soviet Physics JETP*, 58(4), October 1983, pages 688–692; V. N. Alekseev et al., "Investigation of wavefront reversal in a phosphate glass laser amplifier with a 12-cm output aperture", *Soviet Journal of Quantum Electronics*, 17(4), April 1987, pages 455–458; and A. F. Vasil'ev et al., "Stimulated Brillouin scattering at high values of the excess of the pump energy above the threshold", *Soviet Journal of Quantum Electronics*, 17(5), May 1987, pages 644–647. These publications deal with single input beams having spatially uniform intensity distributions over the beam cross-sections. A similar approach with multiple beams of equal intensity was treated in N. G. Basov et al., "control of the characteristics of reversing mirrors in the amplification regime", *Soviet Journal of Quantum Electronics*, 11(10), October 1981, pages 1335–1337. All of these references used collimated beams within the SBS amplifier. In another reference a spatially uniform but phase-aberrated beam was focused inside an SBS amplifier with a spherical lens to obtain high SBS gain within the amplifier; A. F. Vasil'ev, et al., "Effective reflection of radiation with a large angular divergence from an SBS-PC mirror", *Optics and Spectroscopy*, 63(1), July 1987, pages 133–134.

Although the above publications deal with beams of uniform spatial intensity, in most applications a cross-section of the input beam will reveal spatial variations in its intensity. If the input beam to the SBS amplifier is spatially non-uniform, it has been found that the near field of the output beam is quite different from the input beam, and that the far field fidelity is substantially reduced. This has been determined to result from the fact that the gain, and hence the SBS reflectivity, at any particular point within the amplifier is proportional to the input optical intensity at that point. Thus, high intensity areas of the beam ("hot spots") will have a higher reflectivity, and low intensity areas ("cold spots") will be weakly reflected. As a result, the intensity contrast and the shape of the output beam will differ from the input. A substantial difference between the input and output beams will also reduce the far-field fidelity. In some cases the cold spots can be lost from the output beam entirely, even though they may contain a substantial portion of the input beam energy.

The intensity-dependent amplification problem extends beyond SBS amplifiers to other optical amplification techniques that exhibit an intensity dependent gain, such as Raman amplification and four-wave mixing. Cold spots in the input beam can be lost entirely from the output beam, or at least attenuated more than the hot spots. This applies to both single beams with spatial intensity variations, and to multiple parallel beams, which for purposes of the invention may be considered to be a single composite beam with a "hot spot" at each of the individual beam locations.

SUMMARY OF THE INVENTION

The present invention seeks to provide a new optical amplifier structure and method, and an associated PCM, that is much less susceptible to spatial amplification variations that result from spatial intensity variations in an input beam, and in which the near-field image replication and far-field fidelity are substantially enhanced. While most concerned with an SBS PCM, the invention also seeks a general improvement in the uniformity of amplification of any optical seed beam by another optical pump beam, in which the pump beam exhibits spatial intensity variations.

To achieve these goals, the low and high intensity parts of the pump beam are spatially mixed within the amplifier medium so that the integrated gain along any ray path across the input beam is approximately the same as for other ray paths across the beam. Thus, homogeneous gain is achieved across the beam. The preferred mixing mechanism is specially designed to give a somewhat blurred focusing of the beam, thereby avoiding a point focus that could convert an SBS amplifier into an SBS oscillator. This approximate focusing is achieved by using a plurality of lenses that focus the input beam to a plurality of foci spaced from each other along the beam path, and oriented at a substantial angle to each other. In the preferred embodiment a pair of mutually perpendicular cylindrical lenses are used. Lenses with equal focal lengths can be spaced from each other in the beam direction to produce the necessary spacing between the line foci, or alternately two different lenses of unequal focal lengths can be used.

When applied to an amplifier/oscillator PCM, complementary pairs of cylindrical lenses are positioned on opposite sides of the amplifier section so that both the input and phase conjugated beams are mixed within the amplifier, and both are re-collimated after leaving the amplifier. In addition to a substantial improvement in far-field fidelity, a significantly higher energy reflectivity is obtained when the invention is employed in the PCM.

These and other features and advantages of the invention will be apparent to those skilled in the art from the following detailed description, taken together with the accompanying drawings, in which:

DETAILED DESCRIPTION OF THE INVENTION

The invention greatly reduces the "hot spot" effect described above by spatially mixing the pump beam within the amplification medium so that it has approximately the same gain, irrespective of input pump beam intensity variations at the entrance of the amplifier. The invention has particular application to an SBS PCM, in which the input beam serves both as a pump and, after undergoing phase conjugation, as the seed beam to be amplified by the pump beam.

Figure 1:
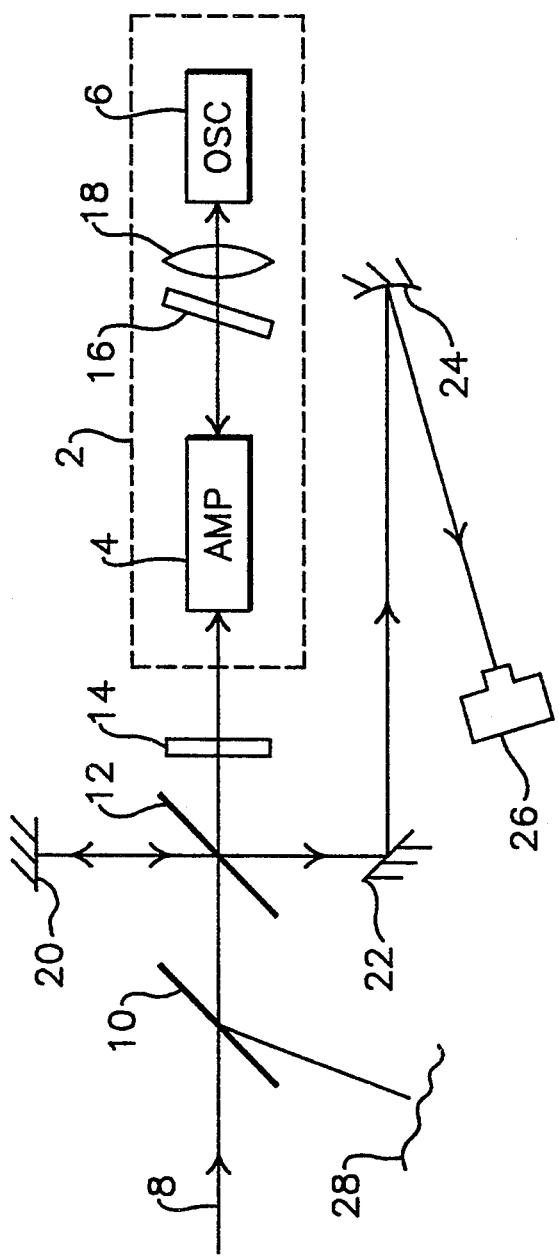
FIG. 1 is a block diagram of a prior PCM system, described above.
Figure 2:
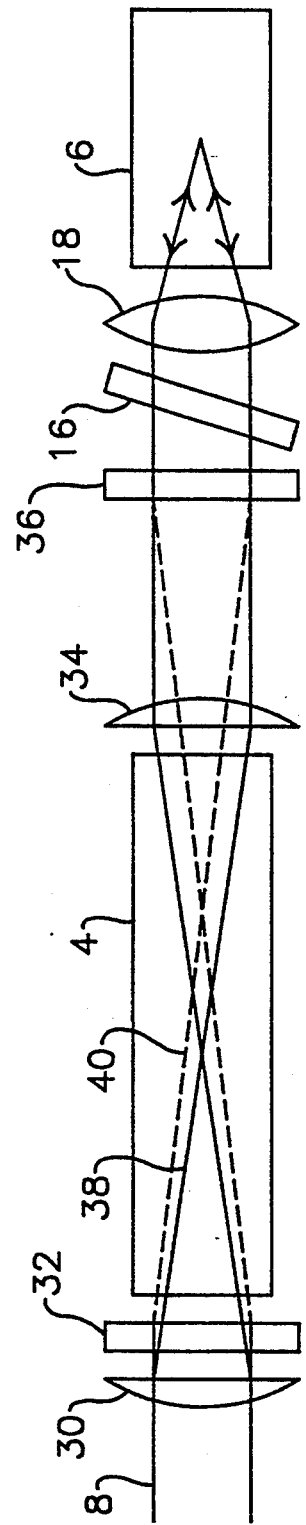
FIG. 2 is a simplified diagram of a PCM arrangement that uses the invention.

The application of the invention to an amplifier-oscillator SBS PCM similar to that of FIG. 1 is illustrated in FIG. 2; the same reference numerals are used to identify elements that are common with FIG. 1. A plurality of lens elements 30,32 are positioned in the path of the input beam 8 on the input side of the amplifier 4, while a complementary set of lenses 34,36 are positioned in the return path of the phase conjugated beam from oscillator 6 on the opposite side of amplifier 4. The function of lens elements 30 and 32 is to mix the input beam 8, which serves as a pump for the phase conjugated return beam, so that the input beam provides an approximately uniform spatial gain distribution where amplification of the return beam takes place within medium 4. While in theory a spherical lens that focuses the input beam to a single spot might be employed for this purpose, in practice the intensity of the beam at its focal spot would likely be high enough to convert the SBS amplifier 4 into an SBS oscillator, thus losing the advantages of the amplifier-oscillator system. Instead, elements 30 and 32 are cylindrical lenses that are oriented perpendicular to each other, so that one of the lenses 30 produces a line focus in a horizontal plane, and the other lens 32 produces a line focus in a vertical plane. By an appropriate selection and positioning of the lenses 30 and 32, the plane of the horizontal focus within the amplifier 4 is spaced somewhat along the beam path from the plane of the vertical focus. The beam is in an approximate or blurred state of focus between the two focal planes; this avoids the intense focusing that could convert the amplifier 4 into an oscillator.

Lens 34 is complementary to lens 30, while lens 36 is complementary to lens 32. As indicated by the solid ray 38, cylindrical lens 30 is oriented to focus the beam to a horizontal line, while the dashed rays 40 indicate that cylindrical lens 32 focuses the beam to a vertical line.

After emerging from the amplifier 4, the input beam is restored to its original collimation by lenses 34 and 36. The restored beam is then coupled into the SBS oscillator 6 by lens 18, where it is phase conjugated and returned to lenses 34 and 36. These lenses focus the return beam to the same vertical and horizontal foci as for the input beam. Upon emerging from the amplifier the expanding return beam is collimated by lenses 30 and 32.

SBS in the oscillator produces a slight frequency shift in the return phase conjugated beam, relative to the input beam. This frequency differential is necessary to establish the SBS energy transfer. The majority of the energy transfer from the input to the return beam occurs in the region around and between the two foci, where the beams are most constricted and their intensities are therefore greatest. For purposes of the invention, multiple parallel beams may be considered to be a single composite beam with intensity zeros between the individual beam components.

Figure 3:
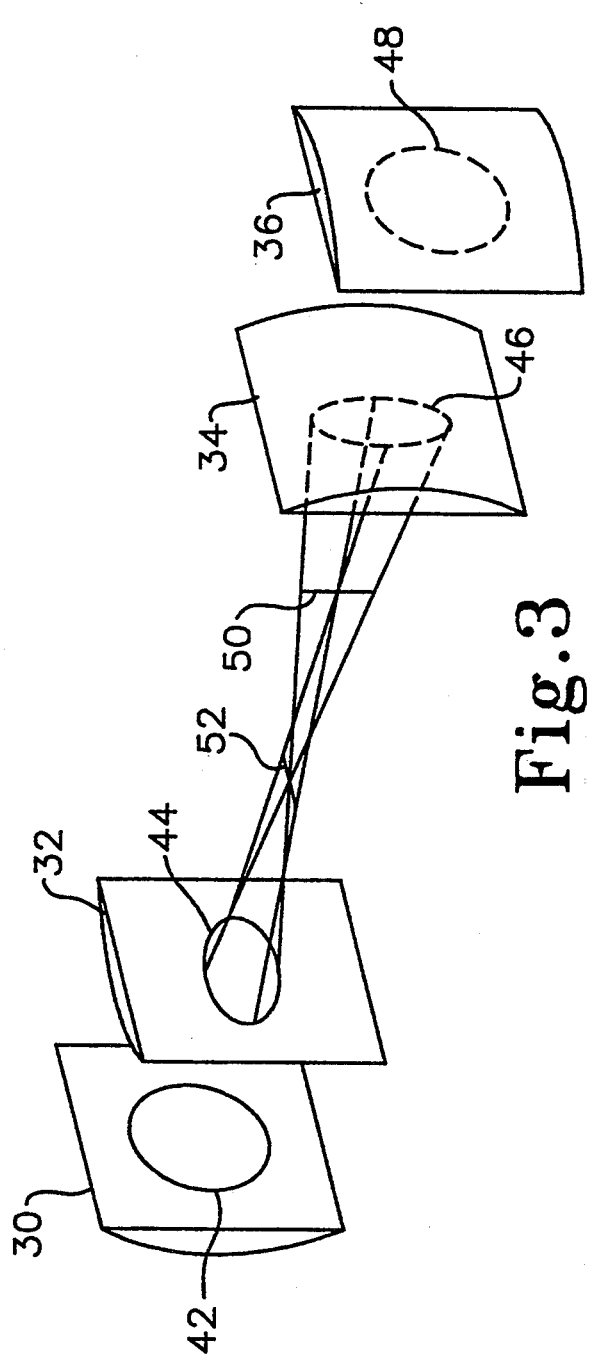
FIG. 3 is a simplified perspective view of the amplifier lens elements employed in the embodiment of FIG. 2.

The blurred beam focusing caused by the transverse cylindrical lenses is further illustrated in FIG. 3. The beam's cross-section at the faces of lenses 30, 32, 34 and 36 are indicated by beam circumference lines 42, 44, 46 and 48, respectively. At the outermost lenses 30 and 36 the beam circumference is essentially circular with the system shown, although in general it can be square, rectangular or many other shapes. At the surface of lens 30 32 the beam circumference 44 is elliptical with a horizontal major axis, while the beam's circumference 46 at the face of lens 34 is again elliptical but with a vertical major axis. In between the lens elements and within the amplification medium (not shown in FIG. 3), the beam is focused to a vertical line 50 by lens elements 32,36, and to a horizontal line 52 by lens elements 30,34. Focal lines 50 and 52 are mutually spaced along the beam path.

The spacing between the vertical and horizontal focal lines can be achieved by selecting vertical and horizontal cylindrical lenses with different focal lengths, or by spacing the lenses on each side of the amplifier from each other. Both mechanisms are used in FIG. 3. As an illustration, horizontal lenses 30 and 34 have a focal length of 20 cm, while vertical lenses 32 and 36 have a focal length of 25 cm. Lenses 32 and 36 are positioned to the right of lenses 30 and 34, respectively, while the spacing between lenses 34 and 36 is also greater than the spacing between lenses 30 and 32.

The output near-field beam shape obtained with the apparatus of FIGS. 2 and 3 has been found to be a good replica of the input beam. Its maximum far-field fidelity of approximately unity is a significant improvement over fidelities of up to about 0.6 obtained with spatially non-uniform collimated beams. A higher energy reflectivity (60-70% vs. 40-45%) was also obtained.

The use of a pair of mutually perpendicular lenses on either side of the amplifier can be readily implemented, but is only illustrative of many variations that may be employed. For example, three cylindrical lenses at angles of 120° or four lenses at angles of 90° may be employed on either side of the amplifier. The angular difference between the various lenses could also be changed so that it is not symmetrical. Perfect focusing to a straight line is also not required; the foci could be curved lines, or two elliptical shapes having major axes that are rotated with respect to each other. The term "line focus" as used herein refers to focusing to either a straight or a curved line, or to a shape that is not a perfect line but has a definable major axis which may be considered to be a focal line.

Figure 4:
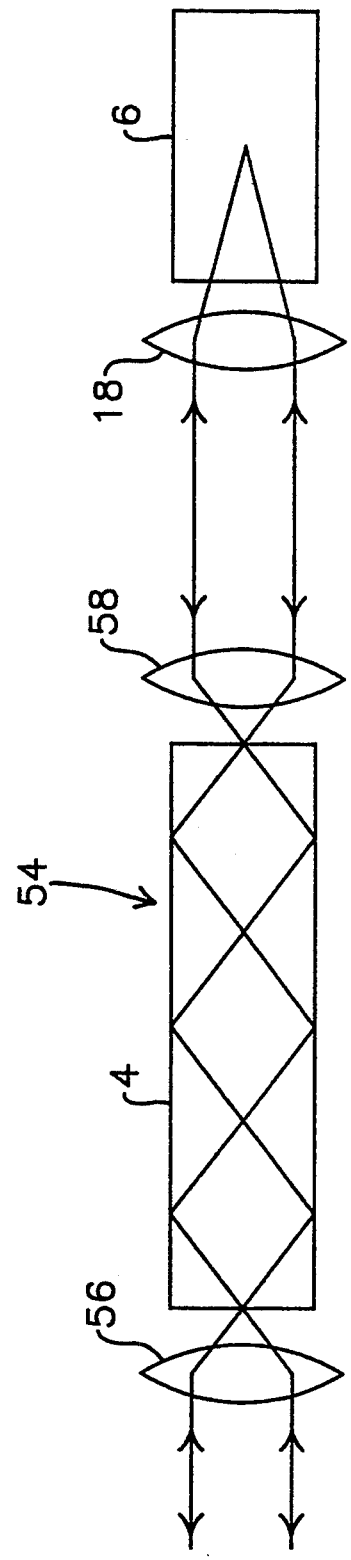
FIG. 4 is a diagram of another PCM embodiment in which a light pipe and focusing lenses are substituted for the lens elements of FIGS. 2 and 3.

FIG. 4 illustrates another embodiment of an SBS PCM employing the invention. The SBS amplification medium 4 is retained within a light pipe 54. The light pipe can be formed either by providing a coating with a reflective inner surface around SBS medium 4, or by selecting the SBS medium and setting up the system optics such that the beams undergo total internal reflection at the medium's boundaries.

Spherical lenses 56 and 58 are positioned in the beam path at opposite ends of the amplifier 4, and have focal lengths that are substantially shorter than the amplifier length. This results in a series of beam crossovers and reflections from the light pipe along its length. Spatial mixing of the beam, and a more uniform intensity distribution over its cross-section, result from the repeated reflections and crossovers. A substantial improvement in the uniformity of return phase conjugated beam amplification can thus be achieved.

Figure 5:
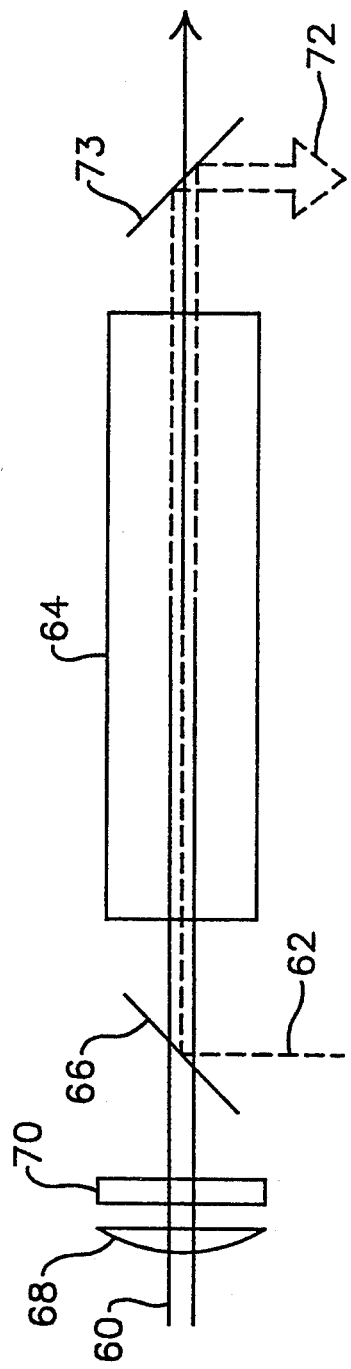
FIG. 5 is a diagram illustrating the application of the invention to a Raman amplifier.

While described thus far in connection with an SBS PCM, the preferred beam mixing apparatus is also applicable to optical amplification in general in which energy is transferred from a pump beam to a seed beam, and the pump beam exhibits a spatial intensity variation. Such an amplifier, based upon Raman scattering, is illustrated in FIG. 5. A high energy pump beam 60 (solid lines) and a lower energy seed beam 62 (dashed lines) are directed coaxially into a Raman amplification medium 64, such as by a beamsplitter 66 that is transparent to radiation at the pump beam wavelength but reflects radiation at the seed beam wavelength. Although only one pump beam is shown, multiple pump beams are often employed. Raman amplification systems are described, for example, in J. Reintjes, R. H. Lehmberg et al., *J. Opt. Soc. Am. B*, 3(10) October 1986, pages 1408–1427. Although beamsplitter 66 may be positioned as shown in FIG. 5, it may also preferably be positioned to the left of lens 68 instead of to the right.

The pump and seed beams coincide along the length of the gain medium, where amplification takes place. A pair of mutually perpendicular cylindrical lenses 68 and 70 are positioned in the input path of the pump beam 60, such that the total integrated gain, along different ray paths originating from different parts of the input beam, are approximately the same. As described above, more than two lens elements could be provided, and their respective focusings need not be exactly linear. The amplified output 72 from the seed beam 62 will have a substantially greater fidelity to the original seed beam spatial intensity distribution, for a non-uniform pump beam, when the orthogonal focusing elements 68 and 70 are added. A second beamsplitter 73 at the output of the gain medium, similar to the input beamsplitter 66, separates the amplified seed beam from the diminished pump beam. Although FIG. 5 indicates an abrupt energy transfer from the pump to the seed beam around the middle of the gain medium, this is a simplification; the actual energy transfer occurs along the entire coincident paths of the two beams through the gain medium.

Figure 6:
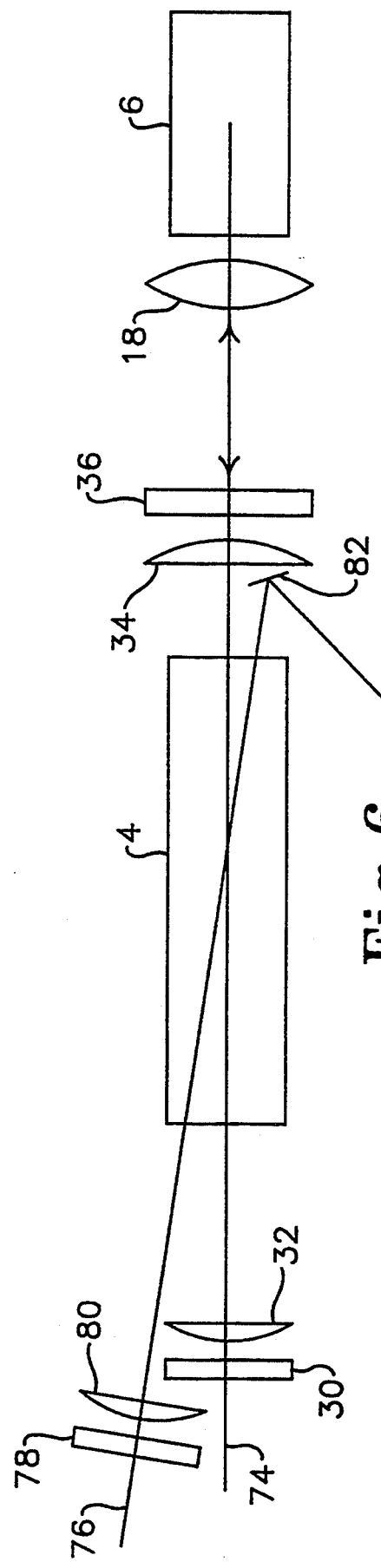
FIG. 6 is a diagram illustrating the application of the invention to a four-wave mixer within a PCM.

Four-wave mixing that uses the invention in connection with a PCM system is illustrated in FIG. 6. An input beam 74 is directed through an SBS amplification medium 4 and into an oscillator 6, which phase conjugates the beam and returns it back through the amplification medium. In this case a pump beam 76 is directed into the amplifier 4, where it intersects and transfers energy to the input beam 74. Whereas the optimum amplification between the input and output beams for the single-beam system of FIG. 2 is 1.0, the addition of the separate pump beam 76 allows for amplifications greater than 1.0. In addition to the cylindrical lens elements 30,32,34,36 positioned at opposite ends of the amplifier and the seed beam path, an additional set of cylindrical lenses 78 and 80 is provided in the input path of the pump beam 76 to give that beam a more uniform integrated gain, to a large degree independent of spatial input intensity variations across the input beam. The diminished pump beam which exits the amplifier may be removed from the system by a mirror 82 or the like.

The invention can thus be seen to have numerous applications to intensity-dependent optical energy transfers. While several illustrative embodiments have been shown and described, numerous variations and alternate embodiments will occur to those skilled in the art. Such variations and alternate embodiments are contemplated, and can be made without departing from the spirit and scope of the invention as defined in the appended claims.

We claim:

1. A phase conjugate mirror (PCM) for an input optical beam that is characterized by a spatially non-uniform optical intensity distribution, comprising:
   a stimulated Brillouin scattering (SBS) amplifier medium in the input beam path,
   SBS phase conjugator means for phase conjugating an input beam that has been transmitted through the amplifier medium and for returning the phase conjugated beam to said amplifier medium for amplification therein by said input beam along a length of said amplification medium, and
   means for spatially mixing said input beam to achieve spatial uniformity of integrated optical intensity along said amplifier medium length, but a local cross-sectional optical intensity distribution that differs from location to location along said amplifier medium length, so that the integrated amplification imparted to different portions of said phase conjugated return beam during transit through said amplifier medium is generally spatially independent of the location of said portions across a cross-section of the return beam and integrated gain homogenization is achieved, while the local spatial amplification pattern imparted to said phase conjugated return beam differs for different locations along said amplification medium length, said mixing means comprising first and second lens sets disposed respectively on the input and phase conjugator sides of said amplifier medium, said lens sets each comprising a plurality of lenses for focusing an input beam in the direction of the amplifier medium to a plurality of line foci that are located within the gain medium and are angularly offset and spaced from each other along the beam path.

2. The PCM of claim 1, said mixing means comprising a light pipe retaining said amplifier medium within its interior, and lenses positioned to alter the collimations of said input and phase conjugated beams so that they undergo internal reflection and consequent mixing within the light pipe.

3. The PCM of claim 1, said amplifier medium comprising a two-wave amplifier.

4. The PCM of claim 1, said amplifier medium comprising a four-wave amplifier.

5. An amplifier for amplifying an optical seed beam by a pump beam that is characterized by a spatially non-uniform optical intensity distribution, comprising:
   a medium for optical amplification by stimulated scattering,
   focusing means comprising at least a pair of cylindrical lenses located near an input side of said optical amplification medium for coupling said pump beam into said medium, said focusing means establishing a plurality of mutually spaced foci of said pump beam within said medium that are oriented at dissimilar angles and produce a mixing of said pump beam within said amplification medium, and
   means for coupling said seed beam into said medium in a directed propagation to traverse said mixed pump beam and receive a transfer of energy from said pump beam along a length of said optical amplification medium, said focusing means mixing the pump beam so that the integrated amplification imparted to different portions of said seed beam over its traversal of said mixed pump beam is generally spatially independent of the location of said portions across said seed beam, the local Spatial optical amplification pattern imparted to said seed beam differs for different locations along its traversal of said mixed pump beam, integrated gain homogenization is achieved for the amplification of the seed beam independent of the spatial nonuniformities of said pump beam, and the local gain imparted to the seed beam at individual locations along its traversal of said mixed pump beam is nonhomogeneous.

6. The optical amplifier of claim 5, said focusing means comprising a plurality of cylindrical lenses having focal orientations that are rotated relative to each other.

7. The optical amplifier of claim 6, said focusing means comprising a pair of cylindrical lenses that are positioned to produce mutually perpendicular line foci of the pump beam within said medium 8. The optical amplifier of claim 6, wherein said lenses are mutually spaced along the pump beam path.

9. The optical amplifier of claim 6, wherein said lenses have unequal focal lengths.

10. The optical amplifier of claim 5, wherein said seed beam coupling means is located in the path of said pump beam on the opposite side of said amplification medium from said focusing means, and is complementary to said focusing means to restore the original pump beam collimation.

11. The optical amplifier of claim 5, said seed beam coupling means establishing a plurality of spaced, generally line foci of said seed beam within said amplification medium that are oriented at dissimilar angles.

12. The optical amplifier of claim 5, said optical amplification medium effecting said energy transfer by stimulated Brillouin scattering.

13. The optical amplifier of claim 5, said optical amplification medium effecting said energy transfer by Raman scattering.

14. A method of phase conjugating an input optical beam that is characterized by a spatially non-uniform optical intensity, comprising:
   spatially mixing said input beam with a stimulated Brillouin scattering (SBS) amplification medium by passing the beam through at least a pair of cylindrical lenses located near an input side of said SBS medium to achieve a mixed beam with an approximately uniform spatial distribution of integrated optical intensities but a local cross-sectional optical intensity distribution that differs from location to location along a return beam path through said SBS medium, phase conjugating said mixed beam, directing said phase conjugated beam back through said SBS medium along said return beam path, and causing said phase conjugated beam to travel in an opposite direction to said input beam within said SBS medium to effect an integrated amplification of the phase conjugated beam by the input beam that is generally spatially independent of location across said phase conjugated beam, a local amplification of the phase conjugated beam that differs for different locations along the return beam path through said SBS medium, and a uniform gain homogenization.

15. The method of claim 14, wherein said input and phase conjugated beams are each spatially mixed by focusing each of them to respective pluralities of mutually spaced and angularly offset line focusings.

16. The method of claim 15, wherein said input and phase conjugated beams are focused to respective pairs of mutually perpendicular line focusings.

17. A method of amplifying an optical seed beam with a pump beam that is characterized by a spatially non-uniform optical intensity distribution, comprising:

focusing said pump beam by passing said pump beam through at least a pair of cylindrical lenses located near an input side of an amplification medium to a plurality of foci that are mutually spaced along the beam path in said amplification medium and angularly offset from each other, such that the total integrated gain along different ray paths originating from different parts of said pump beam are approximately the same along the seed beam path, while the local gain originating from different parts of said pump beam differs for different locations along the seed beam path, directing said seed beam along said seed beam path to travel in an opposite direction to said pump beam between said foci, and transferring energy from said pump beam to said seed beam in the amplification medium to achieve an amplified replication of said seed beam.

18. The method of claim 17, wherein said pump beam is focused to a pair of line foci that are generally perpendicular to each other.

19. The method of claim 17, wherein said pump beam is focused to a plurality of line foci that are mutually spaced along the beam path and angularly offset from each other.

20. The PCM of claim 1, wherein said first lens set comprises a first pair of cylindrical lenses that are positioned to produce mutually perpendicular line foci of the input beam within said amplifier medium, and said second lens set comprises a second pair of mutually perpendicular cylindrical lenses that are complementary to respective lenses within said first lens pair.

21. The PCM of claim 20, wherein the focal length of each lens within said first and second lens pairs is equal to the focal length of its complementary lens in the other lens pair, and unequal to the focal lengths of the other lenses.

22. The method of claim 14, wherein said step of passing the input beam through at least a pair of cylindrical lenses comprises passing the input beam through two cylindrical lenses that are oriented perpendicular to each other.

23. The method of claim 22, wherein said two cylindrical lenses have unequal focal lengths.

24. The method of claim 17, wherein said step of passing the pump beam through at least a pair of cylindrical lenses comprises passing the pump beam through two cylindrical lenses that are oriented perpendicular to each other.

25. The method of claim 24, wherein said two cylindrical lenses have unequal focal lengths.

* * * * *